United States Patent [19]

Schwartz

[11] Patent Number: 4,723,239

[45] Date of Patent: Feb. 2, 1988

[54] SERIAL BUS SYSTEM AND METHOD FOR SELECTION OF BUS SUBSCRIBERS

[75] Inventor: Peter U. Schwartz, Bruchkoebel, Fed. Rep. of Germany

[73] Assignee: Honeywell GmbH, Fed. Rep. of Germany

[21] Appl. No.: 726,855

[22] Filed: Apr. 24, 1985

[30] Foreign Application Priority Data

May 12, 1984 [DE] Fed. Rep. of Germany ....... 3417652
May 30, 1984 [DE] Fed. Rep. of Germany ....... 3420232

[51] Int. Cl.$^4$ ............................................. H04J 3/02
[52] U.S. Cl. ......................................... 370/85; 370/4
[58] Field of Search ................... 370/89, 85, 4, 1, 94; 340/825.5, 825.52; 375/36

[56] References Cited

U.S. PATENT DOCUMENTS

| | | | |
|---|---|---|---|
| 4,084,069 | 4/1978 | Looschen | 375/36 |
| 4,409,593 | 10/1983 | Bose | 370/89 |
| 4,500,990 | 2/1985 | Akashi | 370/85 |
| 4,584,575 | 4/1986 | Ryckeboer | 370/85 |

Primary Examiner—Douglas W. Olms
Attorney, Agent, or Firm—Mitchell J. Halista; Albin Medved

[57] ABSTRACT

In a serial bus system an active representation of the logic states of a bus signal for transmission of both logic states is implemented either on two separate lines for separate transmission of the logic states thereon or on a single line with both logic states being represented by different frequencies.

In the method selection of a subscriber connected to the bus, the subscribers wishing to transmit a message indicate this by issuing a collision signal to the bus. The time period during which the collision signal is issued by each subscriber is chosen in such a way that each subscriber of the bus has the possibility to be prepared for the selection. The selection of the subscriber wishing to transmit a message then is done by means of an address comparison on a bit-by-bit basis.

10 Claims, 7 Drawing Figures

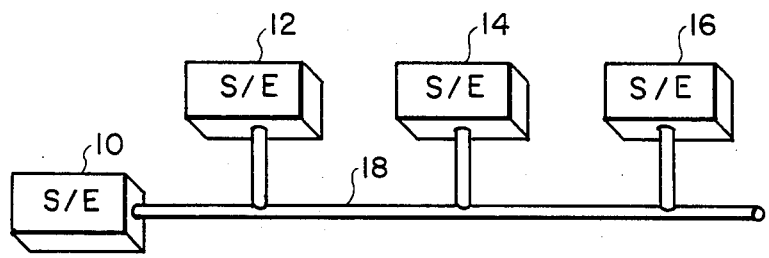
F I G. 1
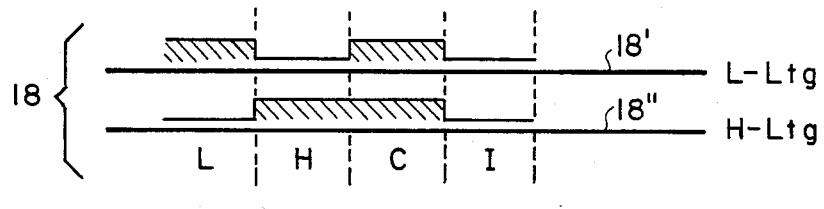
F I G. 2

SERIAL BUS SYSTEM AND METHOD FOR SELECTION OF BUS SUBSCRIBERS

BACKKGROUND OF THE INVENTION

1. Field of the Invention

The present invention relates to a serial bus system and to a method for selection of subscribers connected to said serial bus.

2. Description of the Prior Art

A data highway or a so-called data bus commonly consists of a signal carrying line to which one or a plurality of signal receivers are connected. This data bus is used by one or a plurality of signal transmitters which preferably are operated in time multiplex for transmission of the signals to the receivers. The signals preferably represent binary information. Such buses are not only used in digital systems for connecting different modules, but also are used to connect locally distributed digital systems with such systems usually being called local area networks.

In data transmission through such a data bus, basically four signal states have to be distinguished. Those states are a high condition for signaling the H information, a low condition for signaling the L information, a collision condition for signaling the collision of transmitting activities and an inactivity condition for signaling the inactivity of all transmitters. Those four states are determined by the transmission activities, and they must be recognized by the receivers in order to process not only the data but also the control information of the bus.

Bus systems are known which comprise a plurality of a parallel signal channels, e.g., a 16 signal line bus. Such a structure is appropriate for high transmission rates and for a quick access control. However, the use of such a structure is limited to short ranges due to the high cost for the line and the circuits within receivers and transmitters, i.e., the subscribers.

For a long range transmission a serial bus structure in which in a sequence of bits representing not only data but also control information is transmitted is more appropriate. Since the signaling rate cannot exceed a predetermined maximum value, the highest possible data rate is strongly influenced by the transmission of the control information. The control information portion can be limited if the receiver directly recognizes from the bus signal the actual state among the above-mentioned four states.

Most conventional bus systems actively produce one of both logic states, whereas the other logic state is recognized by the non-presence of said active state. In this arrangement, the recognition of the inactivity state is not possible. A discrimination is only possible if both logic states are actively represented within the bus system. To provide this type of operation, other signaling methods are used which modulate the phase of the signals. However, those methods use a superposition of both logic states on the bus and do not provide a unique signal so that the collision state of the bus system cannot be uniquely recognized. Further, in their active condition the signal transmitters commonly act as a load with a low impedance on the bus. This results in the fact that a unique recognition of the collision state everywhere in the bus system is not possible.

Basically all four conditions of the bus system may be recognized if both logic states are represented by different amplitudes and the amplitudes are allowed to superimpose. However, balancing of the discriminating threshold values is very difficult if the bus is attenuating the signals in the event where a large number of signal transmitters is connected to the bus. A serial bus provides a message channel over which the data sources transmit their information in time multiplex. In order to receive those informations without any errors, a plurality of transmitters cannot be active at the same time. Therefore, a selection method is requested which grants the permission to send to the data sources wishing to send in a timely succeeding manner.

Frequently, the selection of subscribers is controlled by a subscriber having a particular design to do this. In a central system such a selection method may be easily implemented, however, the communication on the bus in such a system is blocked if the controlling central system becomes inactive.

In decentralized systems, the same selection circuits are implemented in all of the subscribers connected to the bus. Certain known decentralized methods are based on a stochastic time distribution of the subscribers activities, wherein the persmission to transmit either is granted by the inactive state of the bus or is delayed by a stochastically varying time interval by the collision with other transmitting activities. If the bus is highly loaded, large delay times may appear for the transmission of different messages with the delay times being stochastically distributed.

Other known decentralized methods are based on the passing of a permit-to-send signal between the subscribers by means of a telegram or "token". In this so-called "token" principal, problems result if the method is started after a subscriber becomes inactive or is added, or if the passing of the telegram includes errors. Additionally, an administrative expenditure of time results for subscribers which do not want to transmit data. A low administrative expenditure is given by the selection according to the principle of the binary search as described in the periodical "Electronic Design", Apr. 5, 1984, on pages 42 to 44. There, during inactivity of all subscribers connected to a serial bus, those subscribers which wish to transmit a message indicate this by transmitting a bus signal and a succeeding address. Each subscriber compares the transmitted address with its own address, and a subscriber is disconnected from the bus if there is a miscompare between the transmitted address and its own address bit. In this way, a subscriber finally remains with its own address equaling the transmitted address.

SUMMARY OF THE INVENTION

An object of the present invention is to provide an improved simple bus system with active representation of the logic states at which all four possible states of the bus system may be recognized directly from the received signal.

A further object of the present invention is to provide an improved selection method of bus subscribers in which the subscriber search is simplified.

In accomplishing these and other objects, there has been provided, in accordance with the present invention, a serial bus system in which both logic states of a bus signal are actively represented either on two separate transmission lines for separate transmission thereon or on one single transmission line with both logic states being represented by different respective frequencies transmitted on the single line. A method for selection of subscribers connected to a serial bus, whereat both logic states are actively represented on said bus, a collision signal is represented by the presence of both logic states and an idle or inactive state is represented by the lack of both logic states, with said subscribers wishing to send a message indicating this by sending a bus signal and following it by an address, whereat each of said subscribers compares said incoming address with its own address and is separated from said bus if a miscompare is detected between the incoming address bit and its own address bit, characterized in that said bus signal preceeding said address is represented by said collision signal.

BRIEF DESCRIPTION OF THE DRAWINGS

A better understanding of the present invention may be had when the following description is read in connection with the accompanying drawings, in which:

FIG. 1 is a bus system serving to connect a plurality of transmitters and receivers, respectively;

FIG. 2 is an example of a first embodiment of a serial bus structure according to the present invention;

DESCRIPTION OF THE PREFERRED EMBODIMENT

Figure 4:
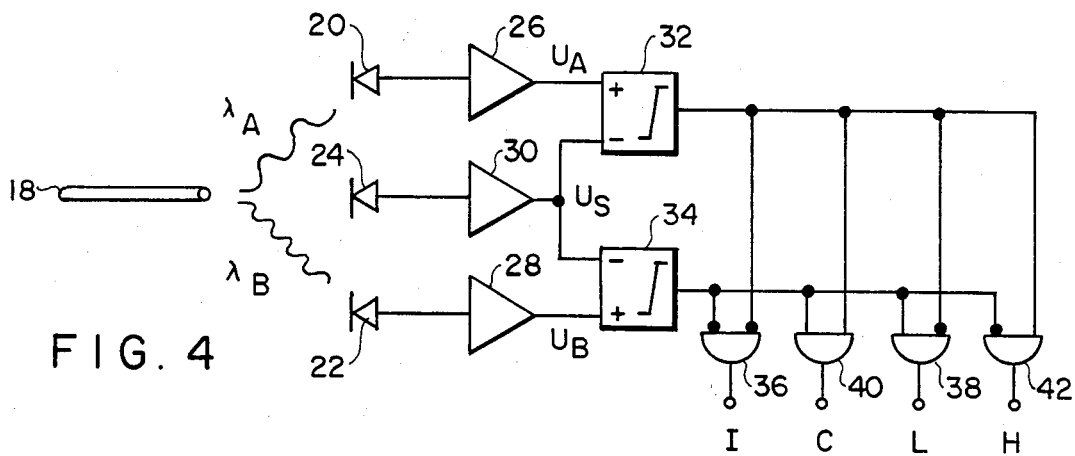
FIG. 4 is a schematic of a first circuit device for evaluating the state of the bus system.

Referring to FIG. 1, a plurality of transmitters and receivers 10 to 16, respectively, are connected to a bus 18. According to a first embodiment shown in FIG. 2, the bus 18 comprises two lines 18' and 18" whereat on the one line 18' the low state L and on the other line 18" the high state H are respectively actively represented. A simple logic circuit, which may be as shown in FIG. 4 as described hereinafter, is used to recognize the signal logic states L, H, C and I.

Figure 3:
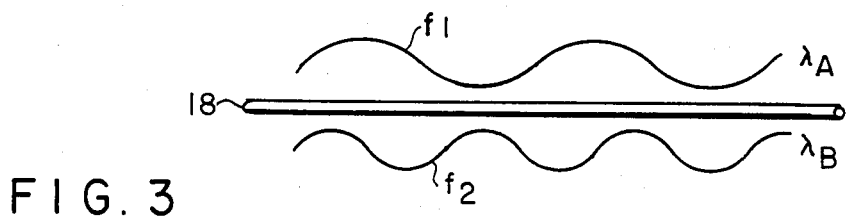
FIG. 3 is a second embodiment of a serial bus structure according to the present invention.

FIG. 3 shows a further embodiment of the present invention in which the bus is comprised of a single line 18. This line 18 may be either a metallic conductor which serves to transmit two carrier frequencies $f_1$, $f_2$ or an optical cable which transmits light waves of different wave lengths $\lambda_A'$ $\lambda_B$. In the first arrangement it would be common to filter out the frequencies $f_1$, $f_2$ and to convert them by rectifier means into corresponding level signals. Since the frequencies $f_1$, $f_2$ are related to both logic states L and H, it is possible to achieve by logical combination all the signal logic states L, H, C and I of the bus system.

In the second event it is possible by means of optoelectronic transducers 20,22, for example, photo diodes with filters integrated into the optical window, to produce signals $U_A$ and $U_B$ from the light waves having the wave lengths $\lambda_A$ and $\lambda_B$. After an amplification of those signals within amplifiers 26 and 28, those signals are applied to threshold comparator means 32 and 34, where they are compared to a reference signal to produce an output signal in the event they exceed the reference signal. The reference signal $U_S$ may be produced by a further optoelectronic transducer 24 and a succeeding amplifier 30 with the transducer 24 serving as a dark current reference. By means of combining the output signals of the threshold comparator means 32 and 34 via logic gates 36 to 42, the logic states I, L, C and H of the bus system can be recognized in a simple manner.

If neither the signal $U_A$ nor the signal $U_B$ exceeds the reference signal $U_S$, a signal is lacking at both outputs of the threshold comparator means 32 and 34, and the output of the AND gate 36 with both inputs being inverted is a "1" signal characterizing the I state.

If the signal $U_A$ exceeds the reference signal $U_S$ and the signal $U_B$ does not exceed the reference signal $U_S$, then the output signal of the threshold comparator means 32 is present, and the output signal of the threshold comparator means 34 is not present so that the AND gate 42 provides at its output a "1" signal characterizing the H state. To this end the output signal of the threshold comparator means 32 is directly applied to the AND gate 42, and the output signal of the threshold comparator means 34 is inverted before being applied to the AND gate 42.

If both signals $U_A$ and $U_B$ exceed the reference signal $U_S$, then both threshold comparator means 32 and 34 provide an output signal which are combined by the AND gate 40 in order to produce an "1" signal characterizing the C state.

Figure 5:
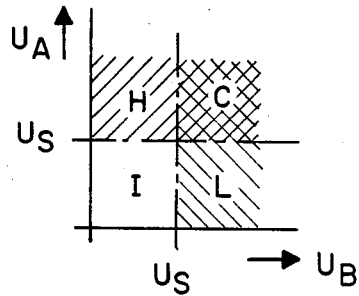
FIG. 5 is a diagram for showing the different states of the bus system to be evaluated.

If the signal $U_A$ does not exceed the reference signal $U_S$ and if the signal $U_B$ does exceed the reference signal $U_S$, no signal is present at the output of the threshold comparator means 32, and a signal is present at the output of the threshold comparator means 34. By inverting the signal and directly applying the second signal to the AND gate 38, a "1" signal is produced by that gate, which signal characterizes the L state. The above described conditions of the bus system as a function of the reference signal $U_S$ are shown in FIG. 5.

Figure 6:
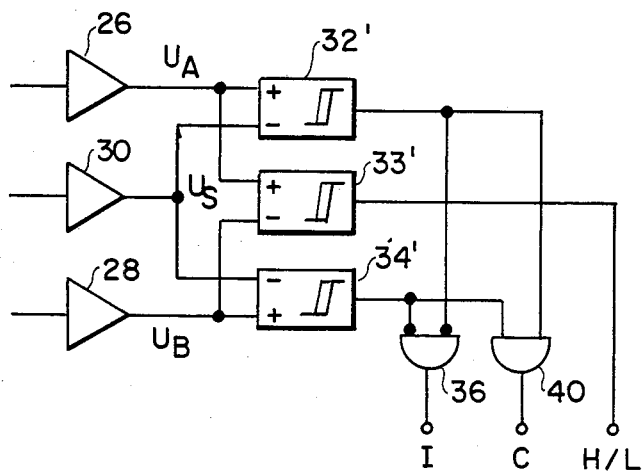
FIG. 6 is a schematic of a second circuit device for evaluating the state of the bus system.

FIG. 6 shows an alternative circuit device for signal evaluation with respect to the circuit of FIG. 4. Herewith the threshold comparator means 32' to 34' are each additionally provided with hysteresis. Furthermore, the logic state of the bus line is determined by a direct comparison of the signals $U_A$ and $U_B$: If $U_A$ is greater $U_B$, then an "1" signal characterizing the H state is produced at the output of the threshold comparator means 33'. The output "H/$\overline{\text{L}}$" indicates the dominating logic state on the bus system, whereas the outputs I and C additionally characterize the quality of the signal.

From the above description it is clear that in the described bus system the four characteristic states of the system independent of a protocol may be recognized from the received signals, in particular the collision C may be recognized independent of signal propogation times and attenuations. Of particular advantage is the optical transmission of different wave lengths within a fiber bus since the additional expenditure as for instance for Y-couplers and filters can be integrated within the optical transmitting and receiving components.

Figure 7:
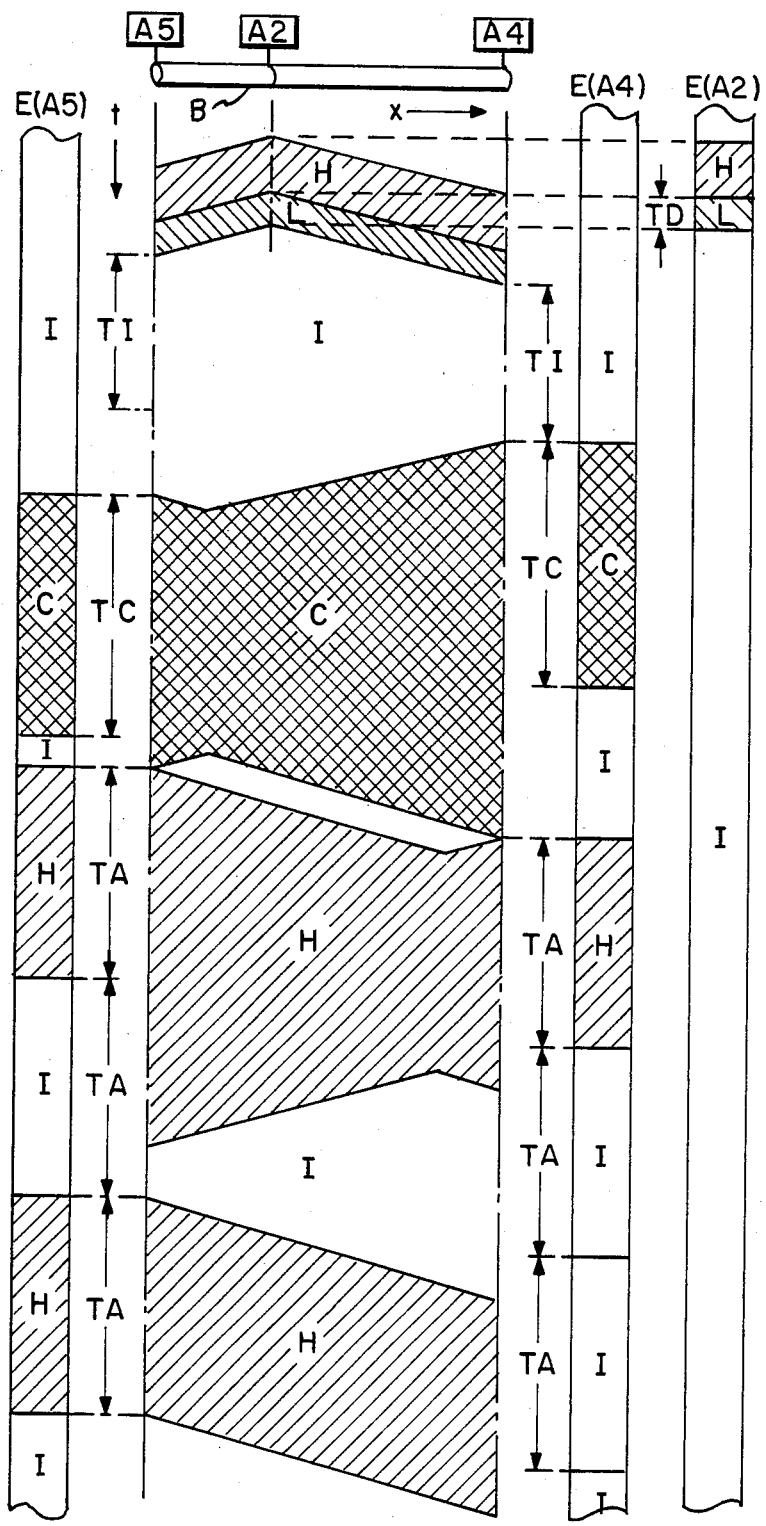
FIG. 7 is a diagram for explaining the selection method according to the present invention.

As shown in FIG. 7, three subscribers A2, A4 and A5 are connected to a bus B. Below the bus B, the propagation times of the bus signals is shown in a space time diagram and lateral to said diagram the signals E(A2), E(A4) and E(A5) transmitted by the subscribers are shown. First, the subscriber A2 transmits according to the shown signal function E(A2). In this connection it should be noted that in the transmission of data blocks the transmission period TD for a data bit may be essentially shorter than the maximum signal propagation time of the bus.

After the subscriber A2 has sent its data, the bus returns to its inactive state. This inactive state in the present example is recognized earlier by subscriber A5 than by subscriber A4. However, since it is assumed that subscriber A4 wants to transmit data, this subscriber after the inactive waiting time TI transmits the C signal. While the C state is propagating on the bus, the desire to transmit arises at subscriber A5 so that this subscriber also transmits the C signal. Both subscribers transmit the C signal only for the period TC. Each of the subscribers A4, A5 starts to transmit its address bits as soon as it recognizes the end of the C state on the bus. Due to the signal propagation time, the address is commonly not transmitted directly after the C signal. The assumed three address bits are transmitted in a sequence with each bit having a time period TA, whereat only the H signal is produced.

The time period TC of the collision signal as well as the time period TA of the address bits must be longer than the sum comprised of the doubled maximum signal propagation time on said bus and the internal maximum signal processing time of said subscribers. Hence, the selection cycle lasts a multiple of the maximum propagation time. If during the selection cycle the length of the I state is not evaluated, then the duration TI may be chosen independent of the duration of the selection cycle.

In the above-mentioned method the selection of subscribers is made according to their highest address, i.e., the priority is predetermined by the address of the subscribers. However, in automatic systems a changeable priority is often desirable in view of the flexibility and the reaction speed of the system. In the present case, this may be achieved by adding additional priority bits to the address bits. Whereas the subscribers must possess different addresses with respect to each other, a plurality of subscribers may possess the same priority. The priority of each individual subscriber may be fixed as provided by the configuration of the bus, may depend on the information to be transmitted or may increase with the waiting time for the permission of transmitting, whereat the rate of increase may depend on the information to be transmitted. With respect to the signals on the bus, the adding of priority bits acts as a supplement of the address with highly significant bits with the selection principle as described remaining valid.

In long transmission sequences the priority control does not result in reaction speeds as they are necessary for critical real time processes. Nearly without any delay time, the information may be transmitted if the subscriber wishing to send in order to transmit critical information first spontaneously transmits a C signal for the period TC in order to prematurely interrupt the running transmission and to start a selection cycle.

After a selection cycle an abortion of the transmission may be prevented during the period TE if in all subscribers the spontaneous transmission of the C signal is suppressed during this time interval. Herewith the time interval TE has to be chosen larger than the time needed for the selection method. A suitable duration allows also the transmission of short data blocks with critical information.

The waiting for the inactive time period TI before the start of a selection cycle as it has been described above results at a high traffic on the bus in belated transmissions. The transmission capacity of the bus may be better utilized if at the end of a transmission sequence the transmitting subscriber additionally produces a C signal during the period TC and herewith starts the next selection cycle.

If a receiving subscriber determines a collision during a data transmission, then errors in the running information are foreseeable, and a continuation of the transmission is inadvisable. Interruption of the distorted transmission may be effected by the receiving subscriber by producing a C signal for the period TC and, therefore, starting a new selection cycle.

Summarizing the selection method according to the invention, all subscribers which wish to transmit information have to wait until the bus is in its inactive state. If this inactive state lasts longer than a predetermined maximum time, then each subscriber which desires to send, transmits the collision signal (C signal) to the bus. Each subscriber produces the C signal for an indispensible duration during which each subscriber connected to the bus has the possibility to be prepared for the selection method.

Subsequently, those subscribers which are willing to send produce their address starting with the most significant bit. Herewith only the H-signals are produced. By means of a hardware logic of the bus, address comparison can be done on a bit-by-bit basis. As soon as a subscriber determines the H state on the bus, whereas its corresponding address bit comprises an L information, this subscriber is removed from the selection cycle and it stops any transmitting activity until a new selection cycle is started. Since the addresses of the subscribers connected to the bus are unique to each subscriber, at the end of the selection cycle only one subscriber has the permission to transmit. The time period of each address bit is fixed. A subscriber wishing to transmit starts to send the most significant address bits if it recognizes the end of the collision state.

The selection method according to the invention shows the following advantages: The method works in a decentralized manner, signal collisions on the bus always may be recognized, the start character for the selection is dominant and is appropriate for interrupting a running transmission, the selection is achieved in a deterministic manner, the possibility of flexible priorities are provided, the transmission capacity of the bus is only stressed to a small extent, the reaction time is short and the throughput under overload conditions is an optimum.

Accordingly, it may be seen that there has been provided, in accordance with the present invention, an improved bus system and an improved method of selecting bus subscribers.

The embodiments of the present invention in which an exclusive property or privilege is claimed are defined as follows:

1. A method for selection of subscribers connected to a serial bus, whereat a pair of binary logic states are actively represented on said bus, a collision signal is represented by the presence of both logic states and an idle or inactive state is represented by the concurrent lack of both logic states, with said subscribers wishing to send a message indicate this by sending a bus signal and following it by an address, whereat each of said subscribers compares said incoming address with its own address and is separated from said bus if a lack of identity is detected between the incoming address bit and its own address bit, characterized in that said bus signal preceeding said address is represented by said collision signal.

2. A method according to claim 1, characterized in that with respect to said address only the high logic state signals are generated.

3. A method according to claim 2, characterized in that the duration of said collision signal and the duration of said address bits each is longer than the sum comprised of the doubled maximum signal propagation time on said bus and the internal maximum signal processing time of said subscribers.

4. A method according to claim 1, characterized by the adding of priority bits as the most significant bits onto said address bits.

5. A method according to claim 1, characterized in that a collision signal during inactivity of all subscribers during a predetermined period is sent by a subscriber wishing to transmit a message.

6. A method according to claim 1, characterized in that the collision signal is spontaneously sent by a subscriber wishing to transmit a message.

7. A method according to one of claims 1, characterized in that for a predetermined duration after a selection cycle abortion of the transmission is prevented, whereat said duration is longer than the time requested for the selection.

8. A method according to claim 1, characterized in that the collision signal is sent at the end of a transmission sequence by a subscriber sending at the end of said transmission sequence.

9. A method according to claim 1, characterized in that in receiving said collision signal during data transmission the receiving subscriber sends said collision signal onto the bus in order to start a new selection cycle.

10. A serial bus system to which a plurality of subscribers are connected with said subscribers wishing to send a message indicating this by sending a bus signal and following it by an address comprising detecting means located at each of said subscribers for detecting a collision state represented by the concurrent presence of a pair of binary logic states, an idle or inactive state represented by a concurrent lack of both logic states, a low logic state represented by one of the pair of logic states and a high logic state represented by the other one of said pair of logic states, a bus including two transmission lines and means for producing a separate transmission of said logic states on respective ones of said lines by each of said subscribers.

* * * * *